United States Patent Office 2,981,233
Patented Apr. 25, 1961

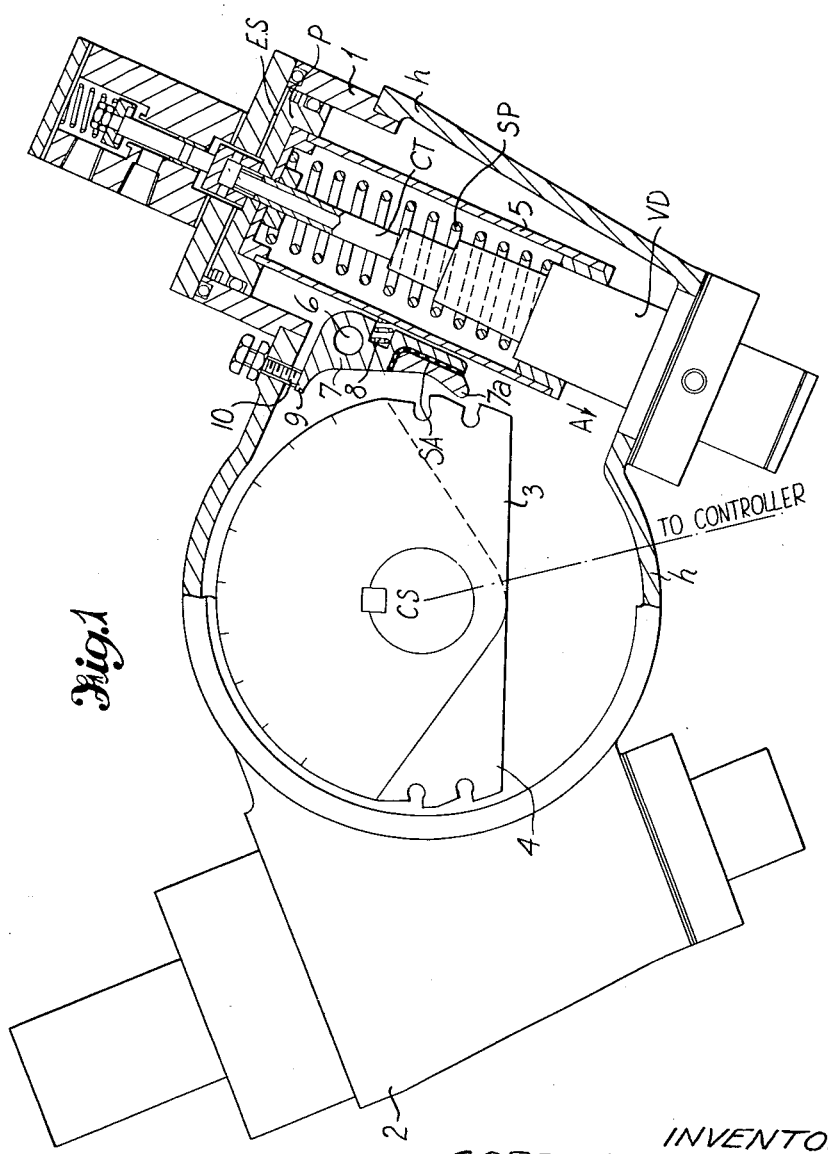

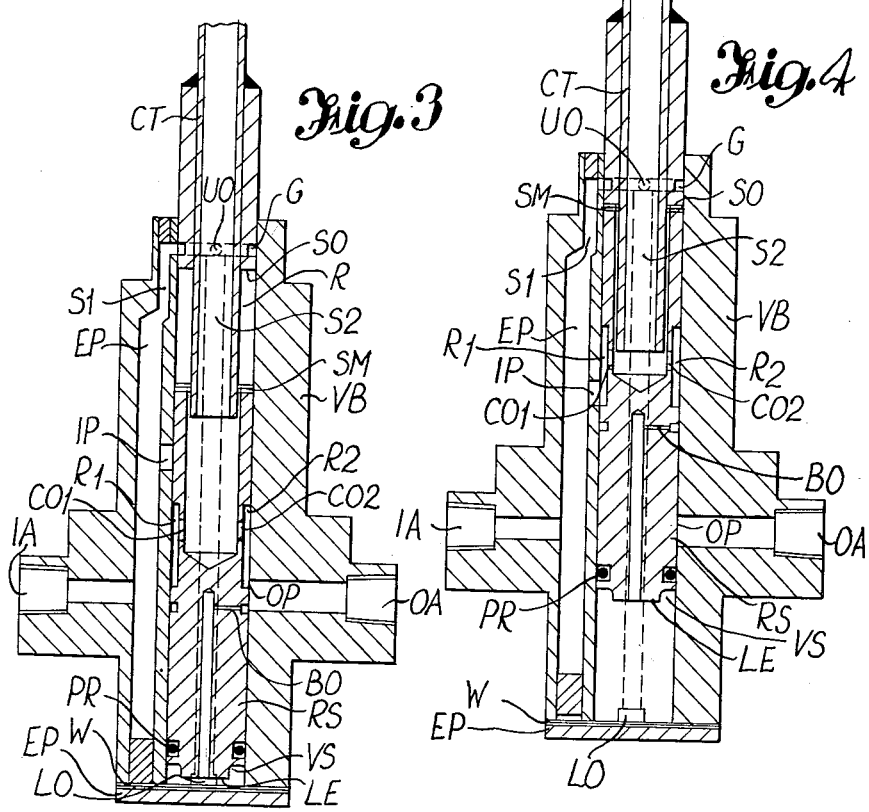
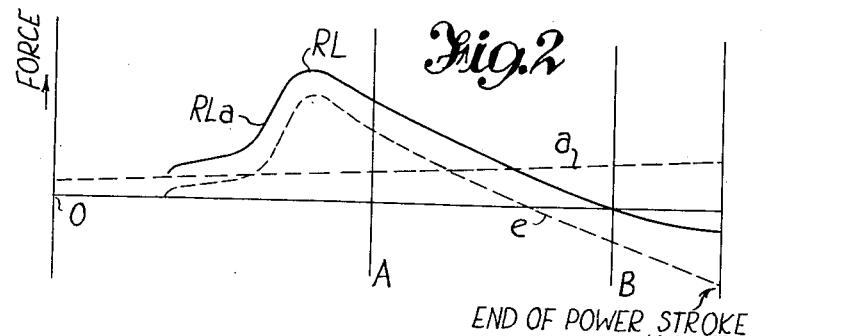

2,981,233

IMPROVEMENT IN AND RELATING TO PNEUMATIC MOTOR SUITABLE FOR ELECTRIC TRACTION CONTROL SYSTEMS

Gordon Collins and John Hudson Graves, Rugby, England, assignors to The British Thomson-Houston Company Limited, London, England, a British company Filed May 5, 1958, Ser. No. 733,000

Claims priority, application Great Britain May 14, 1957

3 Claims. (Cl. 121—38)

This invention relates to pneumatic motors, especially motors suitable for rotating a shaft of a control mechanism in an electric traction system, and aims at providing an improved means for producing a stepped motion of, and for stepping a member, such as a rotatable shaft.

Up to now it has been conventional to rotate the controller shaft, usually a cam shaft, of electric traction control gear through a toothed wheel driven by a rack which is arranged to be moved by the piston of a pneumatic engine, a pawl is arranged to engage in a notch of a star wheel rotating with the toothed wheel when an electromagnet is energized in response to a driver's master controller or a notching or "accelerating" relay, and to be disengaged when the electromagnet is de-energised. Thus the shaft whose angular position determines the control pattern is rotated in one or the other direction while the electromagnet is de-energized and pressure air is admitted to one or the other side of the piston moving the rack.

However, the power required for rotating a cam shaft controlling a heavy traction system, e.g. of an electric train, can be considerable and in such circumstances the torque driving the shaft may cause a roller at the end of a lever acting as a pawl to be pushed free from engagement by the inclined flank of the notch in the star wheel so that the wheel and cam shaft rotate further than intended, a large electromagnet is required to arrest the shaft against the considerable driving torque, and the stopping of the shaft rotation may be delayed by the inherent time constant of a large electromagnet.

These drawbacks are obviated by the present invention which makes it possible to dispense with the electromagnet for determining the position in which a cam or other shaft controlling switching operations of the system is stopped. While the invention is particularly advantageous in conjunction with traction control it will be understood that it can be usefully employed in other electric control systems including rotating control shafts, for instance in connection with electric winder or lift control systems or in conjunction with any other mechanism or system.

Generally, this invention resides in a motor including a pair of reciprocating engines of the pneumatic piston and cylinder type having improved sleeve valves for obtaining the desired supply and exhaust of pressure medium from the engine cylinders, and incorporating means for transmitting power from the two engines to a driven member for movement of the driven member in opposite directions respectively by the two engines.

Advantageously the operating pressure medium is gaseous and is supplied to each engine through a valve controlled by the pressure medium before it enters the cylinder of the reciprocating engine. The supply can be in discrete pulses, so that each stroke of the engine is caused by a separate pulse or continuously for an extended period so as to cause two or more strokes of the piston before the supply of pressure medium is interrupted.

The valve controlled by the pressure medium before entering the reciprocating engine can have a movable sleeve piston member arranged within a recess of a stationary valve body to be operated automatically by the same pressure medium as the pneumatic engine, when this medium enters the valve, so that a simple stop valve in the pressure supply suffices for starting and interrupting the operation of the valve and engine.

According to another feature of the invention a tubular member is fixedly secured to the piston of the reciprocating engine and extends into the said valve sleeve. This tubular member connects by its bore the end space in the pneumatic cylinder to the recess in the valve body, and as it moves with the piston it performs a motion relative to the sleeve piston and the stationary valve body thereby to control openings which direct the flow of pressure medium to operate the valve sleeve in accordance with the position of the piston.

This invention makes it possible to control the operating cycle with expansion of a gaseous pressure medium in the cylinder after the supply thereto has been interrupted before the end of the stroke whereby smooth operation is afforded as desirable for rotating a controller shaft in electric vehicle propulsion systems for instance.

This invention also advantageously provides for the damping of both the engine and valve at the end of their movements to reduce noise and ensure smooth operation of the engine, controller and valve.

Thus the valve controls automatically and smoothly the supply of the operating pressure medium to one end space of the cylinder of the pneumatic engine thereby to cause the stroke of the reciprocating piston moving from one of its two end positions against a biasing force. A valve as preferably used at present for said purpose comprises a stationary valve body, a valve sleeve having a substantially closed end and being reciprocable in an axial recess of the valve body, and a centre tube which is fixed to the piston, extends through the open end of the valve sleeve to provide a communication between the valve sleeve and the end space of the engine cylinder, and has a shoulder to close the annular space between the tube and the wall of the recess in which the valve sleeve reciprocates, the valve sleeve and body having passages and ports to direct and control the flow of pressure gas into and out of the said cylinder space, there being provided in the valve body separate passages, and also ports in this body and a recess in the cylindrical outer wall of the centre tube to control the reciprocating movement of the valve sleeve so that for a piston power stroke pressure gas is first supplied to the space between the closed valve body end and the closed valve sleeve end, which forms a piston face in said valve body, to move the valve sleeve towards the open end of the valve body recess, thereby to cause opening of an inlet port supplying gas to the said cylinder space, whereupon the piston and the valve sleeve move in the direction towards the closed end of the valve body recess to interrupt first the supply to the space between the valve body and sleeve ends, then to interrupt the supply to the cylinder end, and thereafter to open a discharge port for the escape of the operating medium from the said cylinder end.

Advantageously a bleeding opening is provided in the valve sleeve and the valve sleeve may be formed of two parts which are adjustable in relation to each other in order to vary the axial dimension of the sleeve.

The invention will be better understood and more detailed features thereof will be apparent from the following description referring to the accompanying drawings, in which:

Fig. 1 shows partly in section a preferred embodiment of the reciprocating engine of a system according to the invention; also the valve device in its position coaxial in relation to the piston and cylinder of the said pneumatic engine which serves for rotating a controller shaft of an electric traction system, not shown itself for the sake of simplicity;

Fig. 2 is a diagram showing the force acting upon the piston during the power stroke;

Fig. 3 is a longitudinal section through the valve device showing the valve sleeve in one of its end positions; and Fig. 4 is a similar view showing the valve sleeve in the other end position.

Referring to Fig. 1, two pneumatic engines 1, 2 are provided to rotate a controller shaft CS, such as a cam shaft by means of two toother or notched wheels which may comprise wheel sectors 3, 4 only.

For simplicity of explanation the operation of the engines 1 only will be described, the operation of the engine 2 and the mechanism connecting it to wheel sector 4 being similar, except that it produces rotation of shaft CS in the opposite direction.

A sleeve 5 which reciprocates with the piston P of the engine has a pawl 7 pivoted at 6 to it. During the power stroke of the piston the pawl 7 engages in the teeth of the notched wheel 3. The pawl is biased away from the sleeve by means of a spring 8. When the sleeve is in the end position shown, an extension 9 of the pawl 7 bears against a stop 10, which may be adjustable and is situated to move the pawl against the spring bias to a position in which it is clear of the periphery of the toother wheel. In this position the pawl cannot interfere with the rotation of the shaft CS in the opposie direction by the engine 2.

As the sleeve 5 moves with the piston P from its upper end position in the direction of the arrow A, the exension 9 of the pawl leaves the stop 10, the spring 8 rotates the pawl about its pivot so that it engages the wheel 3. Thus each power stroke of the piston rotates the wheel 3 through a predetermined angle. When after the power stroke the piston returns to the end position shown in the pawl slips out of the notch, and in the said end position it is engaged by the stop 10 as mentioned before. A spring SP is provided to bias the piston in a direction opposite to that of the power stroke.

In contrast to the known drives aforementioned the engine 1 or 2 is thus required to produce a force only during the actual power stroke periods, and an operating medium, such as pressure air, need be supplied solely during these periods.

It will be also understood that the invention makes it possible to apply to the controller shaft of an electric control system a large torque as may be required for operating circuit breakers controlling the current of traction or other large motors without the danger of overrunning a notch, for instance when a comparatively light torque only is required for operating a small switch or contact at a particular position of the controller shaft which is usually a cam shaft, and without excessive pressure of the driving medium.

In the diagram of Fig. 2 $e$ denotes the external load on the pneumatic engine, $a$ represents the additional load on the piston of the engine caused by the biasing force, such as by spring SP, which has to be overcome when the piston carries out the power stroke, and RL indicates the resulting load on the piston. It will be understood that the characteristic of the external load is greatly influenced by the inertia of the mechanical system, whose reaction considerably increases the load during the accelerating period of the piston but decreases it at the end of the power stroke, so that the steepness of the ascending slope RL$a$ of curve RL is much greater than that of the continuation of the curve. It will also be understood that ideal operating conditions with no hammering at the valve and stop faces are obtained if the operating medium comprises a pressure gas directed to exert upon the piston a force which varies as the resultant load along the whole of the power stroke. This is possible by suitably controlling the power through the action of the valve device which forms another important feature of the invention. This action consists in admitting the operating medium at the point O when the piston is still in its end position, cutting off the flow of operating medium at an intermediate point A, and opening an escape outlet at another point B nearer the end of the power stroke. Thus expansion of the gas in the cylinder of the pneumatic engine takes place while the piston moves from A to B. It will be seen that at the end of the power stroke the resultant load is negative in the present case so that the biasing force helps to stop the piston in its other end position by overcoming the forward inertia force.

Fig. 3 shows a preferred embodiment of the valve device VD which controls the flow of gaseous operating medium to the upper end space ES in the cylinder the volume of which is defined by the upper face of piston P. The valve device VD comprises a stationary valve body VB secured to the casing $h$ of the engine in a position which is co-axial with the piston P. The body VB is provided with an inlet aperture IA and an outlet aperture OA, both communicating with a recess R in the body VB which contains a reciprocating valve sleeve RS. A centre tube CT extends into said valve sleeve and projects through the piston P, to which it is fixedly secured, to the upper face of the piston which defines the end space ES of the engine cylinder.

Fig. 3 shows in greater detail the valve device VD with its sleeve member RS in its lower end position which it assumes when the piston P is in the rest position shown in Fig. 1. In this position the end space VS forms an air buffer between the lower closed end LE of the valve sleeve RS and the end of the recess R in the body VB which is closed by an end plate EP preferably through the intermediary of a washer W between the faces of the valve body and end plate. It will be seen that the valve body VB has an inlet IA and an outlet OA communicating with inlet port IP and outlet port OP in the wall of the recess R of the valve body. Control port openings CO1, CO2 which may be extended by recesses R1, R2 are provided diagonally opposite each other in the wall of the sleeve member RS to co-operate with the port openings IP and OP thereby to control the flow of the operating medium into and out of the space ES.

A portion of tube CT is enlarged, by a shoulder SO which ensures a plunger-like closure at the top end of the recess R. In the cylindrical surface of this plunger an annular groove G is provided to communicate, on the one hand, with the opening of a channel S1 branching off a passage EP which also connects the inlet IA and port IP, and on the other hand, with the upper opening UO of a longitudinal channel S2 in the valve body VB, the lower opening LO of which communicates with the end space VS formed between the valve body VB and the end face of the sleeve member RS. This arrangement of passageways serves for controlling the valve sleeve motion by the pressure fluid supplied through the inlet IA and thereby the power stroke of the piston P. A bleeding opening BO is provided to extend through the closed end of the sleeve member RS, to facilitate the operation as will be seen later. A piston ring PR or the like sealing member may be arranged in a groove near the end face of the sleeve member RS to prevent undesirable leakage between the valve sleeve and body, as is known in the art.

Shims SM can be provided on the top end of the valve sleeve RS to adjust the relative position in which the shoulder SO engages the valve sleeve to move it in accordance with the piston motion. Thus close tolerances can be obtained and it will also be understood that variations in cut off can be provided for to suit different applications by lengthening or shortening the upper edge of the recesses R1, R2.

The operation is as follows: When a stop valve (not shown) is opened and pressure gas supplied to the inlet IA while the piston and valve sleeve are in the positions shown in Figs. 1 and 3 pressure gas admitted through EP, S1, G, further opening UO, channel S2 and opening LO into the space VS moves the valve sleeve RS upwards until it is stopped by the shoulder SO. Then opening CO1 of sleeve RS registers with the port IP in the valve body VB, at which instant pressure gas is supplied through the hollows of valve sleeve RS and tube CT to the space ES of the cylinder thereby starting the downward movement of piston P. With the piston the tube CT now moves downwards, thereby closing the upper opening UO and interrupting the flow of pressure gas to the space VS. As the shoulder SO of tube CT on its downward movement pushes the top of valve sleeve RS the latter moves with the piston downwards. It will also be noted that simultaneously a dash-pot like damping effect is provided which reduces or prevents hammering of the valve and engine. By the downward movement of valve sleeve RS the opening CO1 in the valve sleeve is moved away from the inlet port IP and the supply of pressure fluid to the space ES in the cylinder is interrupted (point A in Fig. 2). The gas contained in space ES now expands, the piston and valve sleeve move further on, and the opening CO2 in the latter comes into register with the port OP in the valve body so that pressure fluid can discharge from the space ES (point B in Fig. 2). As pressure gas from the space VS can escape through the bleed opening BO and outlet OA, the valve device is reset while the piston P is moved back to its upper or rest position by the action of spring SP. The next power stroke follows immediately if a stop valve supplying the inlet IA is maintained open.

It will also be understood that variations are possible without departure from the invention as defined by the appended claims. Additionally a spring loaded stop may be arranged to engage in the notches of a star wheel, but in this case it only secures the predetermined angular positions of the shaft without being required to retain the cam shaft in position against the force of a pneumatic engine.

While the pawl has been shown as an integral piece it may be subdivided and a shock absorbing member SA, such as a rubber element may be arranged between the main body of the pawl and its tip portion. The two parts may be of metal and bonded to the rubber element as is known in the art.

Advantageously the operating medium is supplied to that engine which is arranged to rotate the camshaft away from the "driving power off" position through a valve which is interlocked to pass operating medium, such as pressure air, only when sleeve RS is in the end position shown. Thus the invention can be used on control systems which conventionally operate in such manner that when the electric supply is interrupted the camshaft is automatically rotated to the "power off" position which would comprise directing the operating medium to the "other" engine of the invention.

The said interlock is arranged to operate when an electric interruption occurs during a power stroke of the engine which is rotating the camshaft from the "off" position and by its operation prevents the supply of pressure fluid from being transferred to the other engine which would cause this latter engine to initiate a power stroke before the former engine has completed its cycle thus allowing both pawls to be engaged simultaneously.

Where required such pressure medium interlock valves can be provided for both engines.

While the engines have been shown in a space saving V-arrangement, it will be understood that other arrangements are possible, such as with parallel axes which would simplify manufacture.

Other simplifications are possible. For instance if the recesses R1, R2 communicate with each other along the outer surface of sleeve RS and form an annular undercut the edges of which co-operate with ports IP and OP to control the flow of operating fluid into and out of the space ES, one opening only is required in the wall of sleeve RS and the other one of openings CO1, CO2 can be dispensed with, unless it is desired to provide for ample gas flow area also in the case when the valve sleeve RS is angularly displaced.

Since in the quiescent state the valve sleeve RS is in the exhaust position, any slight leak through a stop valve can pass through BO to atmosphere, thus preventing gradual build up of pressure in space ES.

What we claim is:

1. An engine of the pneumatic piston and cylinder kind having means for transmitting power strokes therefrom to a member to move it in opposite directions, a valve controlled by pressure medium for admitting pressure medium to only one end of said cylinder on one side of said piston, means for biasing said piston for the return stroke thereof, said valve comprising a stationary valve body with an axial recess at one end thereof, a valve sleeve having an open end and a substantially closed end and being reciprocable in said axial recess in said valve body, and a center tube fixed to said piston and extending through said open end of said valve sleeve to provide a communication between the interior of said valve sleeve and the space at the said end of said cylinder, said center tube having an external shoulder to close the cylindrical space between the outer wall of said tube and the wall of said recess in which said valve sleeve reciprocates, the valve sleeve and body having separate passages and ports to direct and control the flow of a pressure medium into and out of said cylinder, the cylindrical outer wall of said center tube having a recess therein for directing pressure medium to control the reciprocating movement of said valve sleeve in such manner that for a power stroke of said piston the pressure medium is first supplied to the space between the closed end of said valve body opposite said recessed end and the closed end of said valve sleeve which forms a plunger end in said valve body end, thereby to move the valve sleeve towards the open end of the valve body recess and to cause opening of one of said ports for supplying pressure medium to said cylinder space whereupon said piston and said valve sleeve move in the direction towards the closed end of the valve body recess to interrupt first the pressure medium supply to the space between the valve body and sleeve ends, then to interrupt the pressure medium supply to said cylinder, and thereafter to open a port for the escape of the pressure medium from said cylinder.

2. A motor including a pair of reciprocating engines of the pneumatic piston and cylinder kind, means including a toothed wheel for transmitting power strokes from said engines to a driven member for rotation in opposite directions respectively by said two engines, each of said engines having a pawl drivingly connected to the piston of its respective engine for operating said toothed wheel in one direction, adjustable stop means for adjusting the inoperative position of each pawl and for independently varying the operating stroke thereof, a valve for each engine controlled by pressure medium for admitting pressure medium to only one end of the cylinder of its respective engine at one side of the piston of said engine, means for biasing said piston for the return stroke thereof, said valve comprising a stationary valve body with an axial recess at one end thereof, a valve sleeve having an open end and a substantially closed end and being reciprocable in said axial recess in the valve body, and a center tube fixed to said piston and extending through said open end of said valve sleeve to provide a communication between the interior of the valve sleeve and the space at the said end of the cylinder, said center tube having an external shoulder to close the cylindrical space between the outer wall of said tube and the wall of said recess in which said valve sleeve reciprocates, the valve sleeve and body having separate passages and ports to direct and control the flow of a pressure medium into and out of said cylinder, the cylindrical outer wall of said center tube having a recess therein for directing pressure medium to control the reciprocating movement of said valve sleeve in such manner that for a power stroke of the piston the pressure medium is first supplied to the space between the closed end of said valve body opposite said recessed end and that closed end of said valve sleeve which forms a plunger end in said valve body end, thereby to move the valve sleeve towards the open end of the valve body recess and to cause opening of one of said ports for supplying pressure medium to said cylinder space whereupon said piston and said valve sleeve move in the direction towards the closed end of the valve body recess to interrupt first the pressure medium supply to the space between the valve body and sleeve ends, then to interrupt the pressure medium supply to said cylinder, and thereafter to open a port for the escape of the pressure medium from said cylinder.

3. A system as claimed in claim 1, wherein said valve controlling the flow of pressure medium into and out of the space at said end of said engine cylinder is constructed and arranged so as to admit said flow of pressure medium to the space at the said end of said cylinder before said engine piston starts its power stroke against a biasing force, and to interrupt such flow when said piston arrives at an intermediate point of its power stroke, and then to open one of said ports for the escape of the pressure medium from the said end space at a predetermined point before the piston arrives at the end of its power stroke.

References Cited in the file of this patent

UNITED STATES PATENTS

| | | |
|---|---|---|
| 395,862 | Winslow | Jan. 8, 1889 |
| 2,831,356 | Wiman | Apr. 22, 1958 |
| 2,841,119 | Segerstad | July 1, 1958 |